No. 645,093. Patented Mar. 13, 1900.
T. HITCHEN.
BAKER'S OVEN.
(Application filed Oct. 22. 1897.)

(No Model.) 12 Sheets—Sheet 1.

WITNESSES
John Buckler
L. M. Muller

INVENTOR
Thomas Hitchen
BY
Edgar Tate & Co
ATTORNEYS

No. 645,093. Patented Mar. 13, 1900.
T. HITCHEN.
BAKER'S OVEN.
(Application filed Oct. 22, 1897.)
(No Model.) 12 Sheets—Sheet 2.

No. 645,093. Patented Mar. 13, 1900.
T. HITCHEN.
BAKER'S OVEN.
(Application filed Oct. 22, 1897.)
(No Model.) 12 Sheets—Sheet 3.

WITNESS
John Buckler
L. M. Muller

INVENTOR
Thomas Hitchen,
BY
Edgar Tate & Co
ATTORNEYS

No. 645,093. Patented Mar. 13, 1900.
T. HITCHEN.
BAKER'S OVEN.
(Application filed Oct. 22, 1897.)
(No Model.) 12 Sheets—Sheet 4.
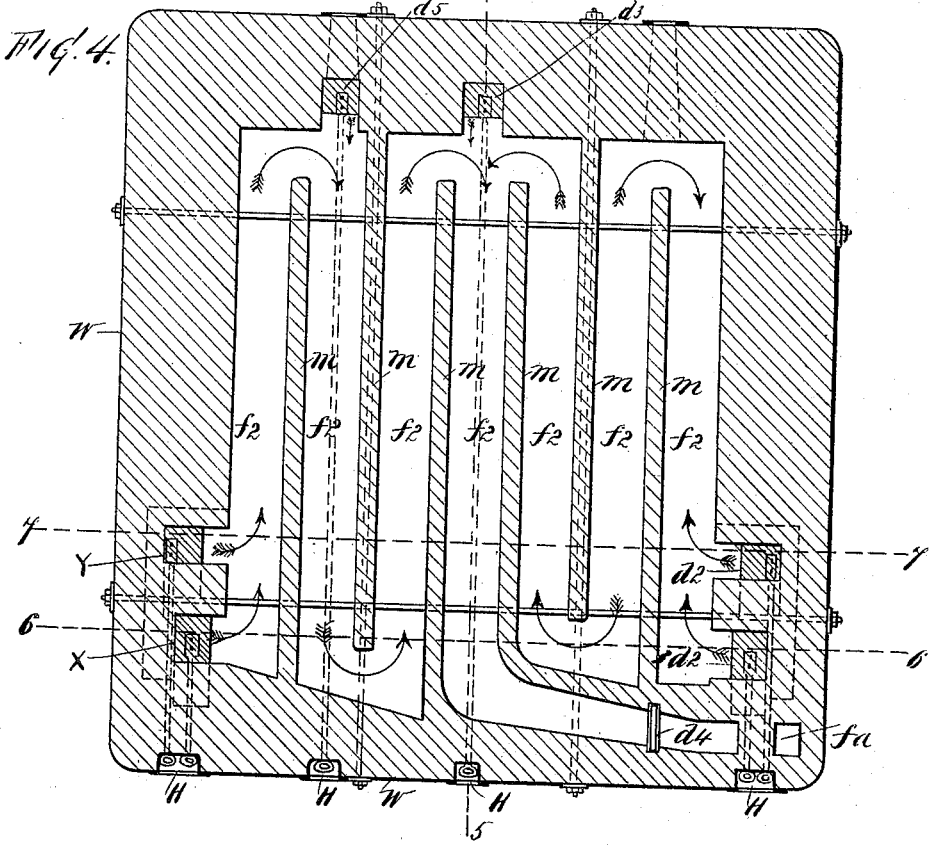
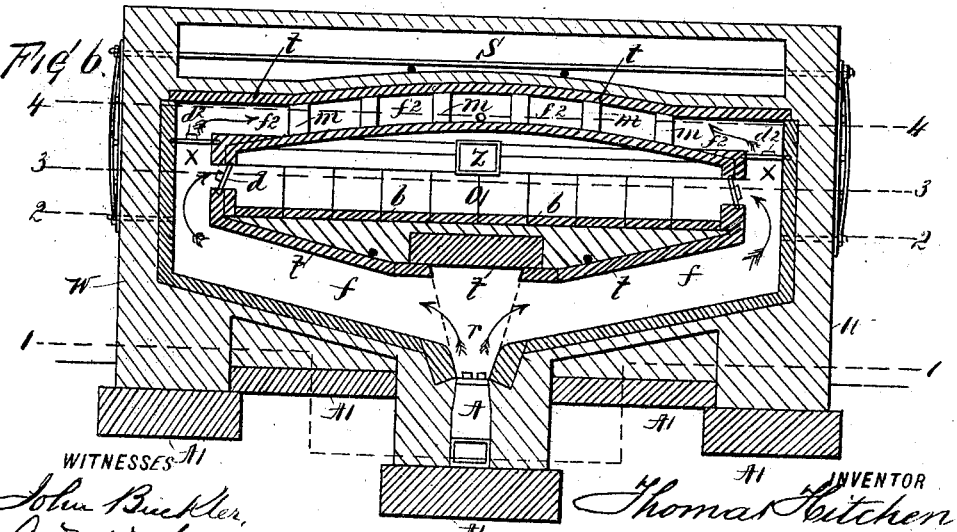
WITNESSES
John Buckler
L. M. Muller
INVENTOR
Thomas Hitchen
BY
Edgar Tate & Co.
ATTORNEYS

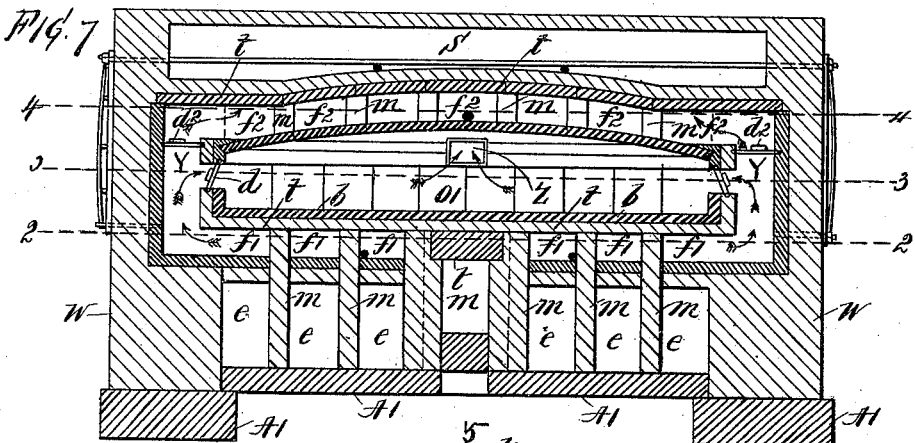

No. 645,093. Patented Mar. 13, 1900.
T. HITCHEN.
BAKER'S OVEN.
(Application filed Oct. 22, 1897.)
(No Model.) 12 Sheets—Sheet 6.
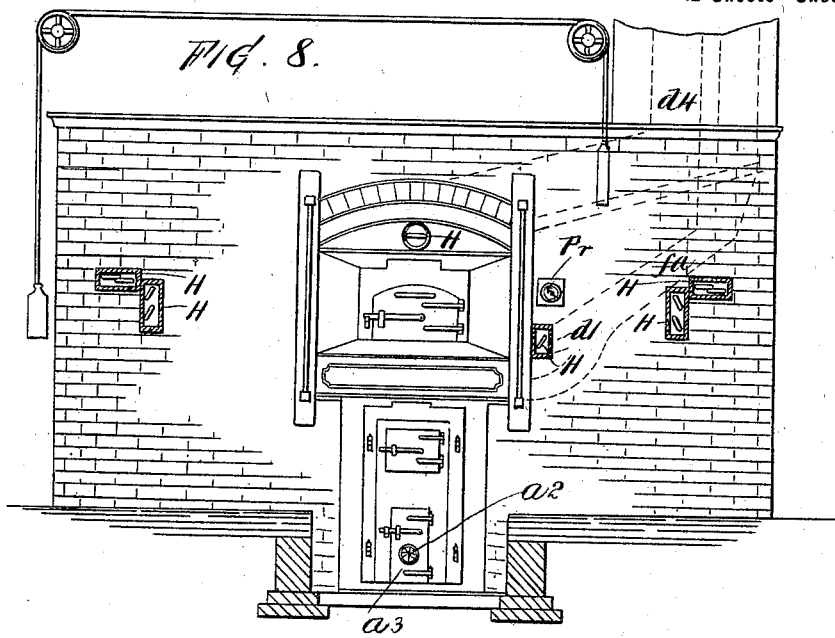
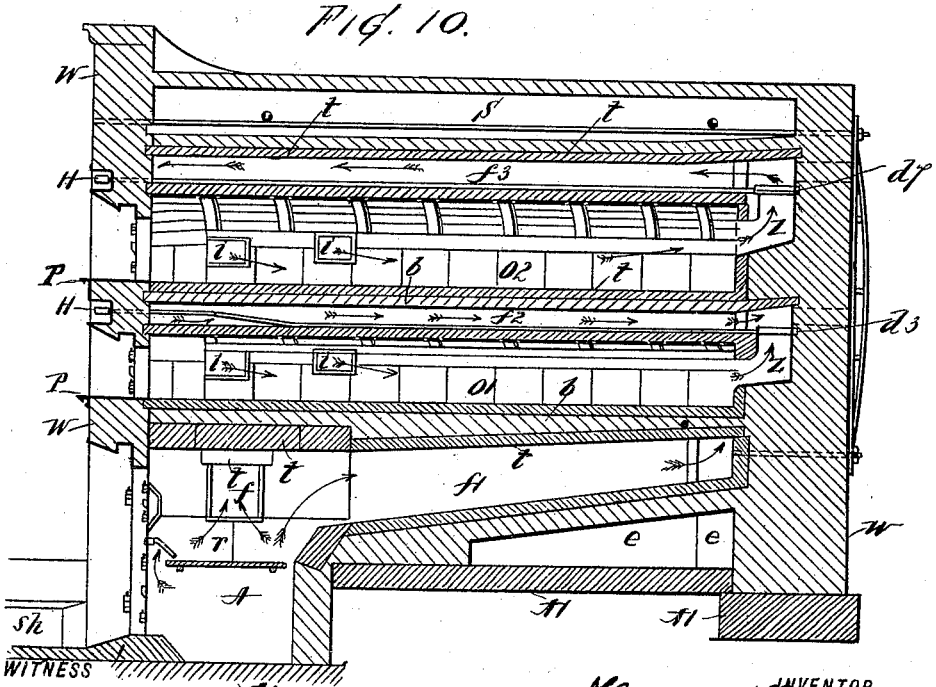
WITNESS
John Buckler
L. M. Muller
INVENTOR
Thomas Hitchen,
BY
Edgar Tate
ATTORNEYS.

No. 645,093. Patented Mar. 13, 1900.
T. HITCHEN.
BAKER'S OVEN.
(Application filed Oct. 22, 1897.)
(No Model.) 12 Sheets—Sheet 7.
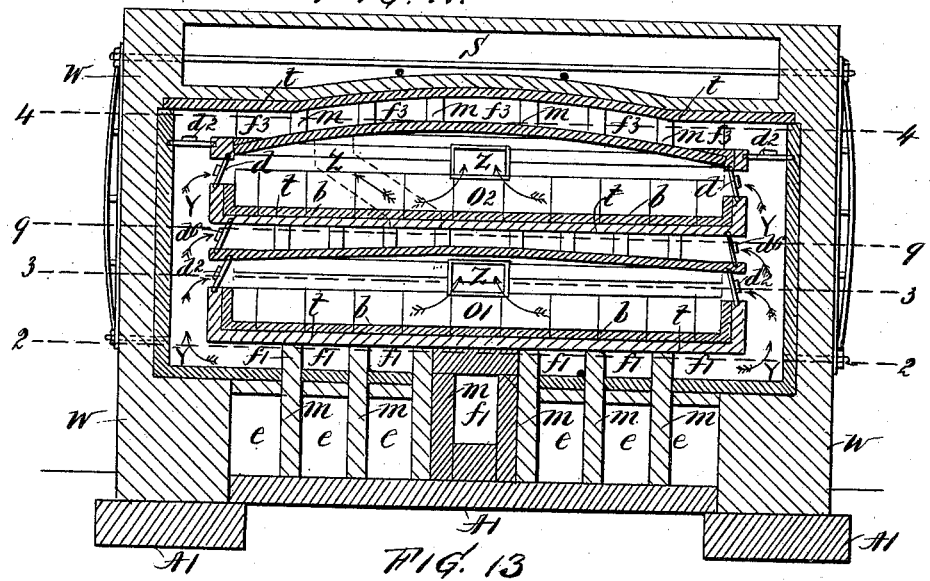
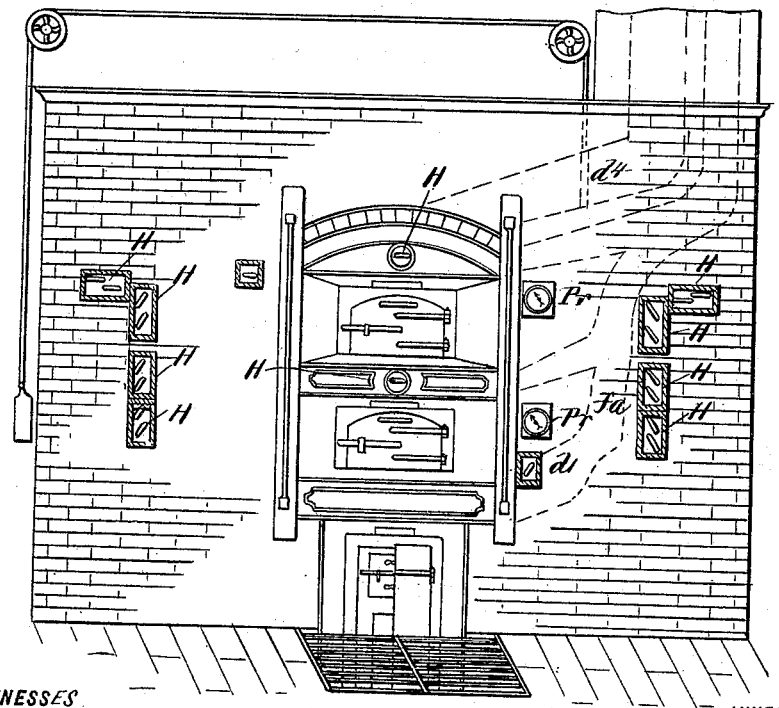

No. 645,093. Patented Mar. 13, 1900.
T. HITCHEN.
BAKER'S OVEN.
(Application filed Oct. 22, 1897.)
(No Model.) 12 Sheets—Sheet 8.

WITNESSES
John Buckler,
L. M. Muller

INVENTOR
Thomas Hitchen
BY
Edgar Tate & Co
ATTORNEYS

No. 645,093. Patented Mar. 13, 1900.
T. HITCHEN.
BAKER'S OVEN.
(Application filed Oct. 22, 1897.)

(No Model.) 12 Sheets—Sheet 9.

No. 645,093. Patented Mar. 13, 1900.
T. HITCHEN.
BAKER'S OVEN.
(Application filed Oct. 22, 1897.)

(No Model.) 12 Sheets—Sheet 11.

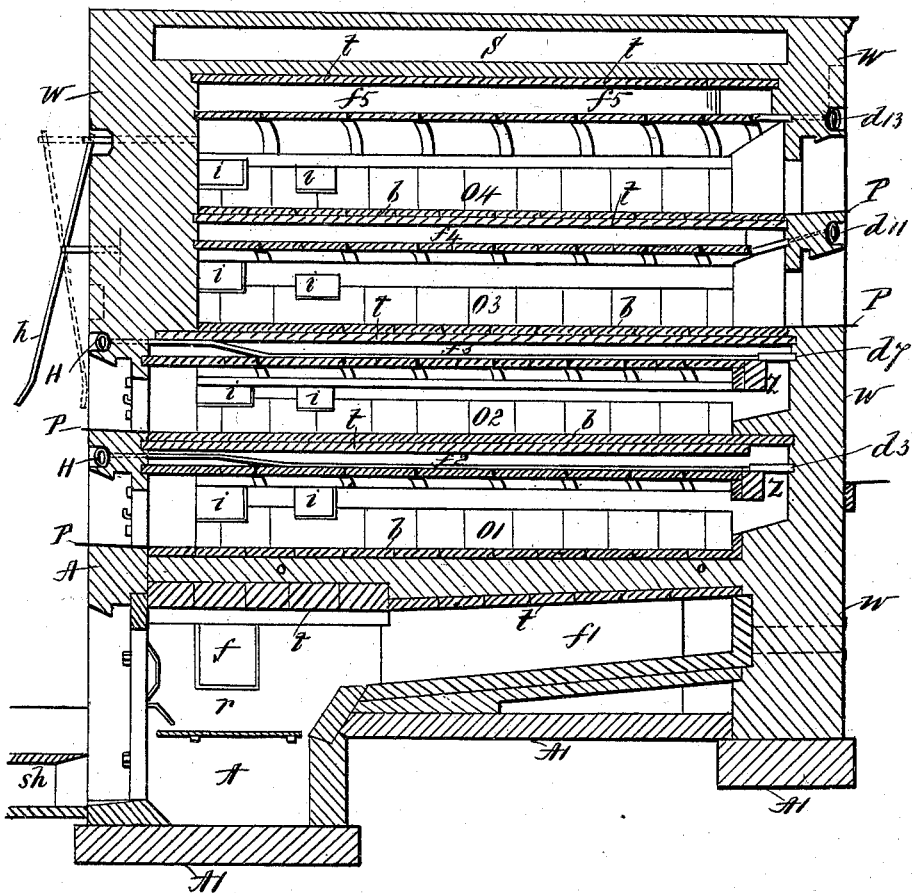

UNITED STATES PATENT OFFICE.

THOMAS HITCHEN, OF SYDNEY, NEW SOUTH WALES.

BAKER'S OVEN.

SPECIFICATION forming part of Letters Patent No. 645,093, dated March 13, 1900.

Application filed October 22, 1897. Serial No. 656,059. (No model.)

*To all whom it may concern:*

Be it known that I, THOMAS HITCHEN, a subject of the Queen of Great Britain, residing at Ferry Road, Yube Point, Sydney, in the Colony of New South Wales, have invented certain new and useful Improvements in Bakers' Ovens, of which the following is a specification, such as will enable those skilled in the art to which it appertains to make and use the same, reference being had to the accompanying drawings, forming part of this specification, in which the separate parts of my improvement are designated by the same letters of reference throughout the several views.

The object of this invention is to provide improved continuous baking-ovens for baking bread, biscuits, pastry, or confectionery, and the invention is the same as that for which I have applied for Letters Patent in the Colony of New South Wales; and said invention is fully disclosed in the following specification, of which the accompanying drawings form a part, in which—

Figure 1:
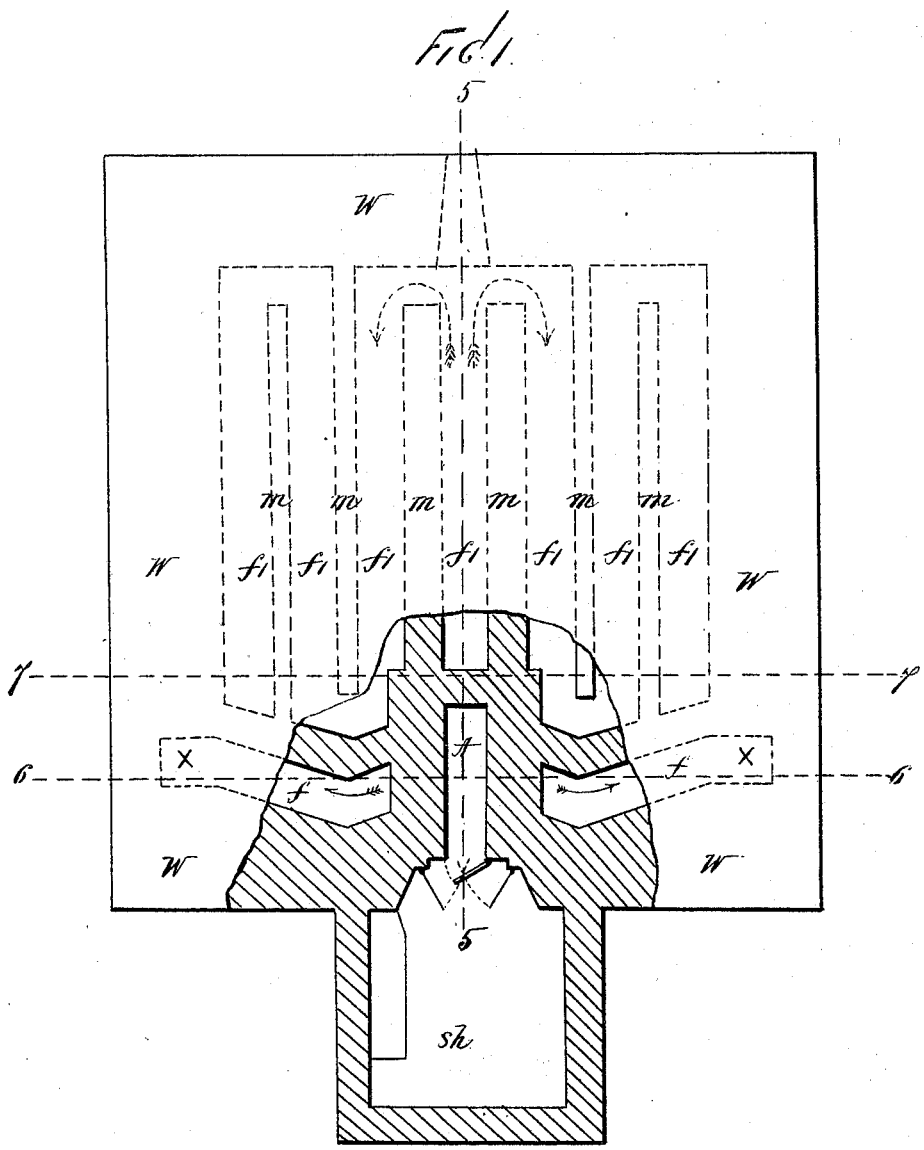
Figure 2:
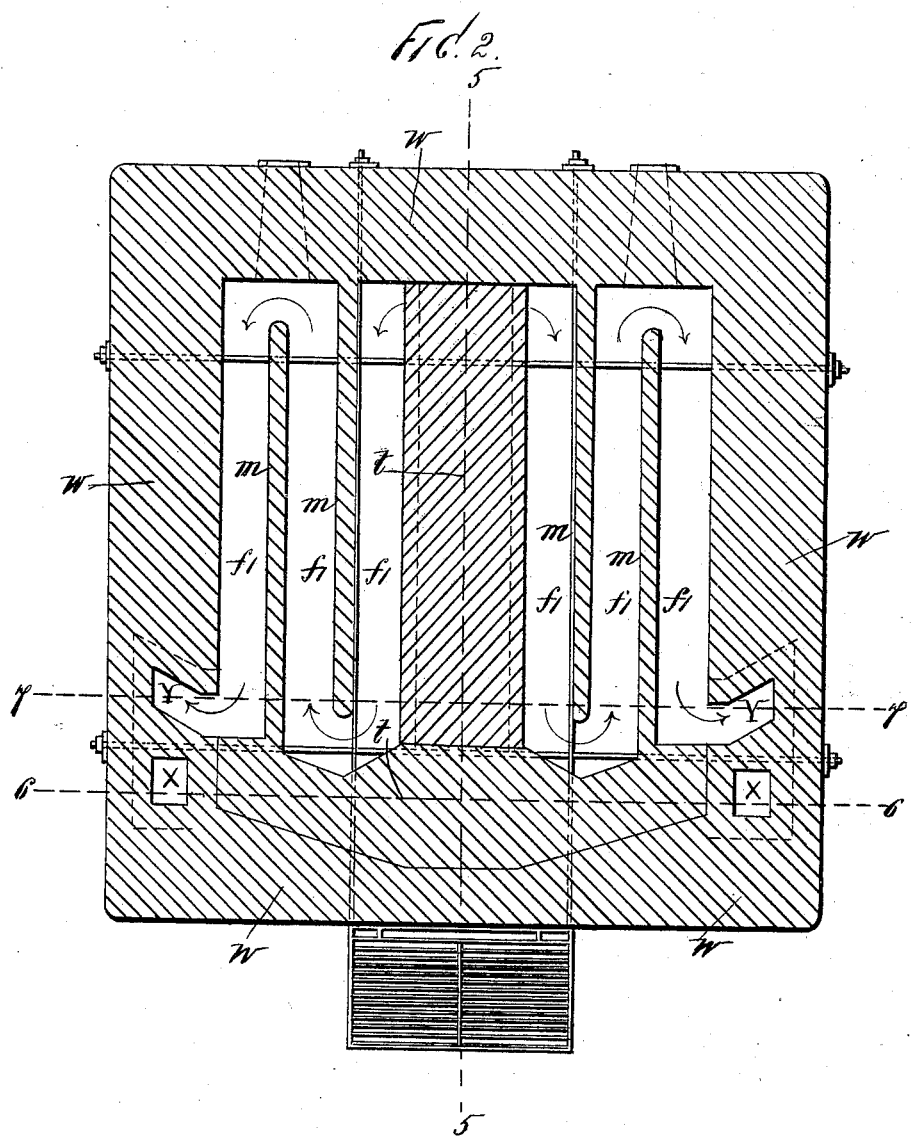
Figure 3:
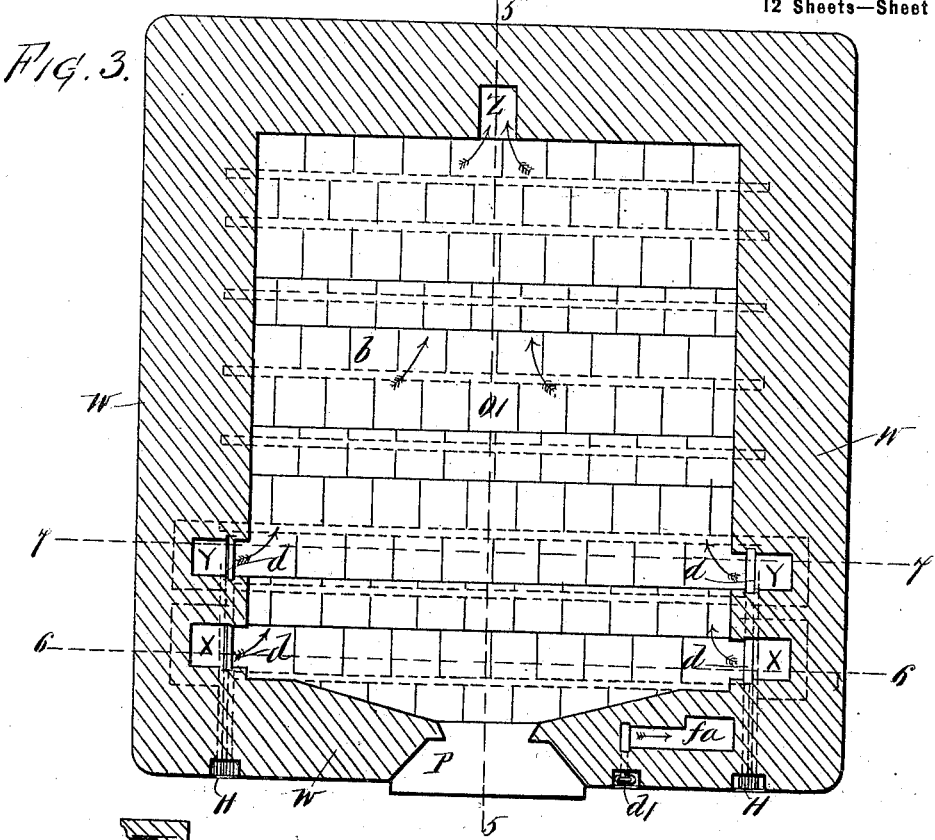
Figure 5:
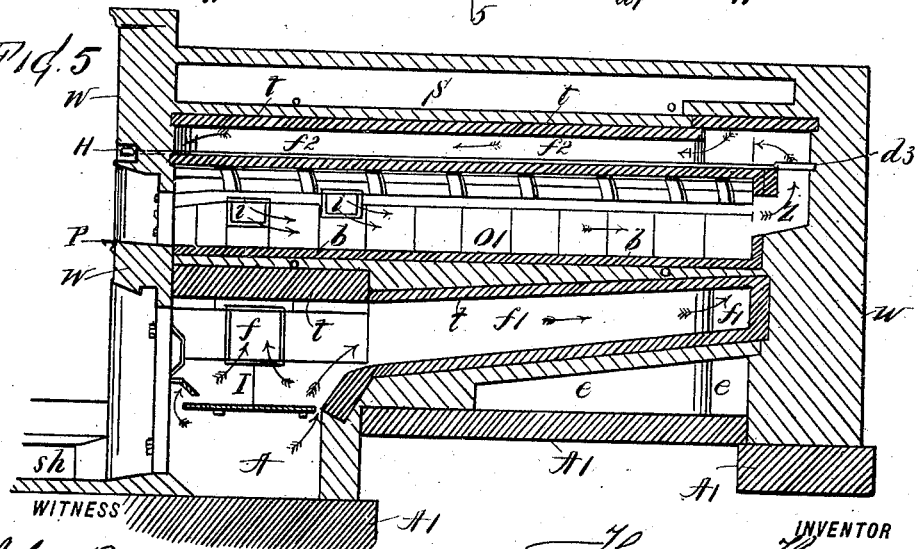
Figure 12:
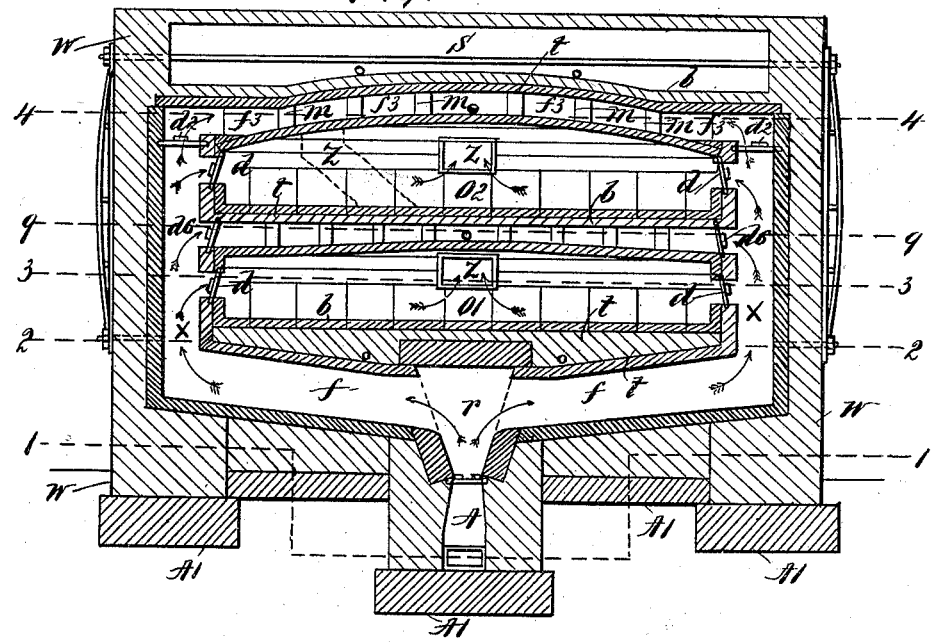
Figure 14:
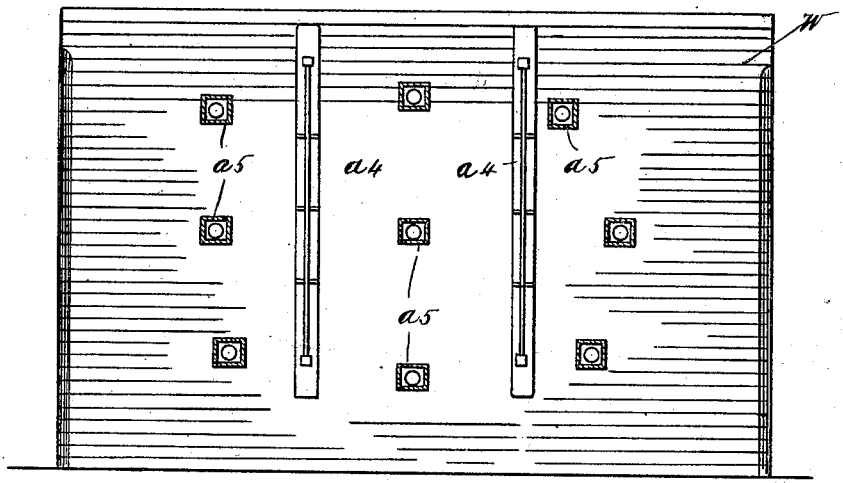
Figure 15:
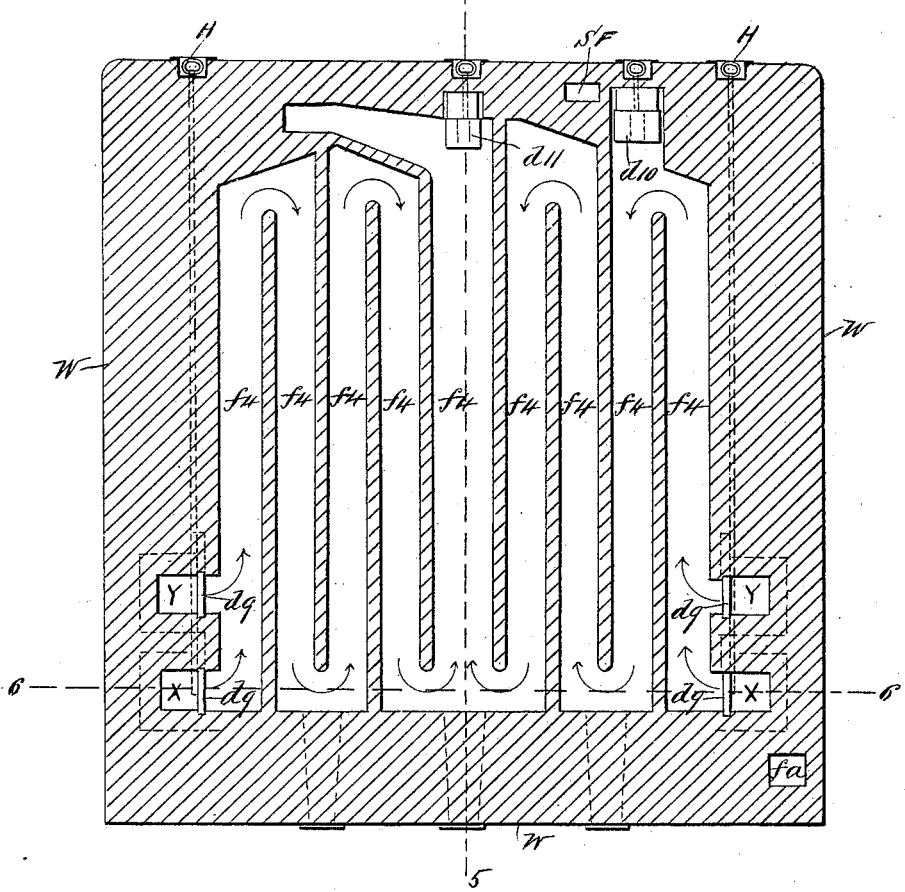
Figure 16:
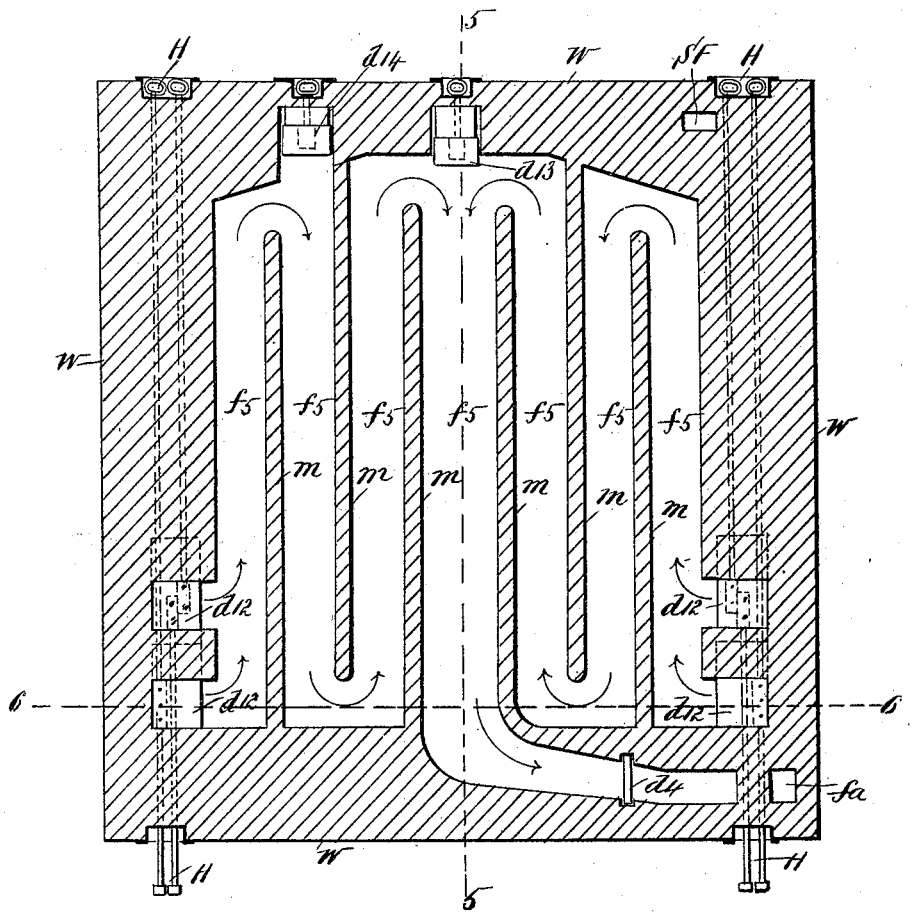
Figure 17:
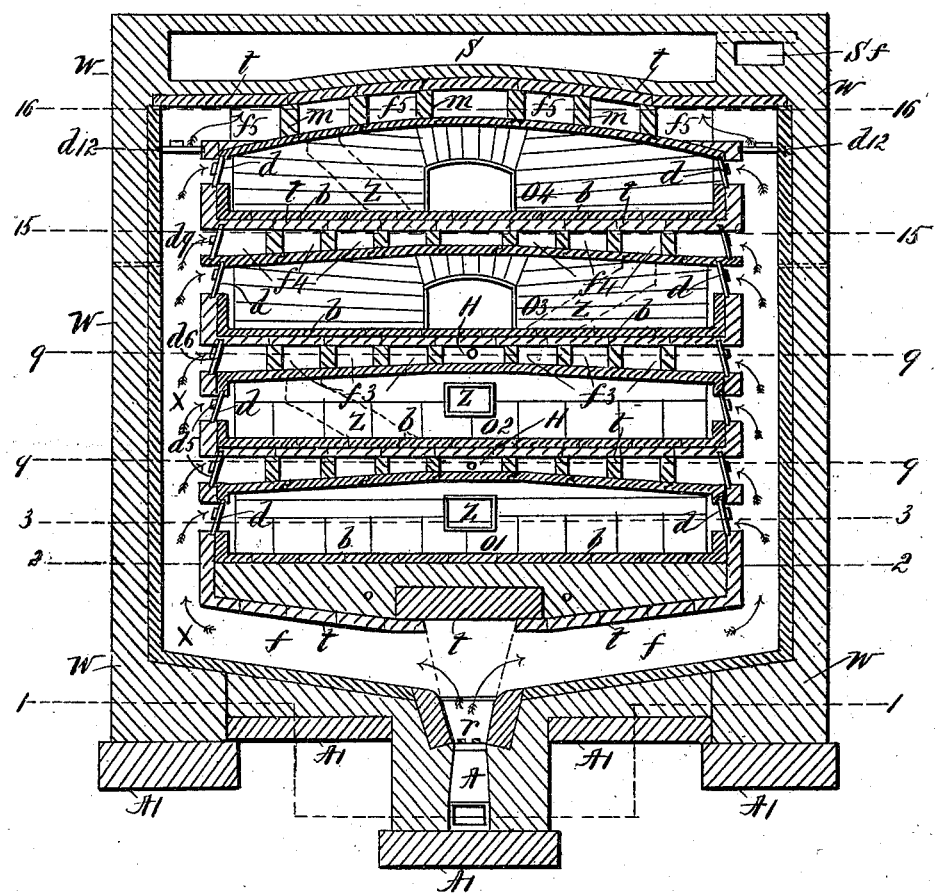

Figure 1 is a foundation plan view of my improved furnace and showing the ash-pit, said figure being partly in section on the line 1 1 of Figs. 6, 12, and 17; Fig. 2, a bottom sectional plan on the line 2 2 of Figs. 6, 7, 11, 12, and 17; Fig. 3, a sectional plan on the line 3 3 of Figs. 6, 7, 11, 12, and 17; Fig. 4, a sectional plan on the line 4 4 of Figs. 6, 7, 11, and 12; Fig. 5, a longitudinal section on the line 5 5 of Figs. 1, 2, 3, 4, 9, 15, and 16; Fig. 6, a sectional elevation on the line 6 6 of Figs. 1, 2, 3, 4, 9, 15, and 16; Fig. 7, a sectional elevation on the line 7 7 of Figs. 1, 2, 3, 4, and 9; Fig. 8, a front elevation of a single oven, showing flues in dotted lines for carrying away fumes from the furnace and over the oven-doors and showing the movement of said fumes, and said figure also shows a pyrometer P $r$ for indicating the heat; Fig. 9, a plan view on the line 9 9 of Figs. 11, 12, and 17; Fig. 10, a longitudinal section similar to Fig. 5, but showing a furnace provided with a plurality of ovens; Fig. 11, a sectional view similar to Fig. 7, but showing a plurality of ovens; Fig. 12, a sectional view similar to Fig. 6, but showing a plurality of ovens; Fig. 13, a front elevation of a furnace provided with two ovens, showing the flues in dotted lines and arrows, as in Fig. 8, and pyrometers P $r$; Fig. 14, a back elevation of a furnace provided with two ovens and showing buckstaves $a^4$ and soot-doors $a^5$; Fig. 15, a plan view on the section-line 15 15 of Fig. 17, showing the flues S F for carrying away fumes from over oven-doors; Fig. 16, a plan on section-line 16 16 of Fig. 17; Fig. 17, a sectional elevation similar to Fig. 6, but showing a furnace provided with four ovens and showing the working doors open of the two upper ovens; and Fig. 18, a sectional view similar to Fig. 5, showing a furnace provided with four ovens.

The details of this invention relate to the general construction, arrangement, and relative positions of the separate parts of the furnace, the flues, uptakes, inlets, outlets, and dampers and the crown of the ovens, and one of the chief objects in view is to reduce and economize the consumption of fuel and to properly regulate the dampers of the oven and prevent unequal heating; and my improvement will be found to economize space, save cost in construction and repairs, and prevent over and under baking, which often takes place in baking ovens or furnaces as now constructed.

According to this invention the ovens can be heated internally and externally or externally alone or partly one and partly the other, as may be desired. The said ovens may also be constructed of any size that is customary for bakers' ovens under the present system or larger, if desired, with equally good results and are arranged and constructed singly, or on what is known as the "Dicker" principle, one above the other in heights of two or more ovens, all heated from one furnace. When three or four ovens are constructed on this principle, the two upper ovens are worked from the opposite end to that of the lower ovens and on a higher floor-level. The heating can be continued during the time the bread or other articles are being baked, and after being withdrawn the oven can be immediately refilled with another batch, or the ovens may be worked alternately, thus securing continuous baking without intermission. By regulating the dampers different degrees of heat can be obtained from any or all of the ovens to suit the various classes of goods, which is a great advantage over bake-ovens as at present constructed.

Having now described the nature and the object of my invention, I will proceed to describe more in detail the manner in which the same is carried out or put into practical effect, reference being had to the separate figures of the accompanying drawings and to the letters of reference marked thereon, similar letters of reference referring to like parts throughout the several views.

In the drawings forming part of this specification the uptakes X X in the several views connect the furnace to the flues and ovens and allow the heated gases or hot air to pass through the interior of any of the ovens or over the top thereof, and uptakes Y Y in the several drawings are to allow the heated gases or hot air from the furnace after passing through the flues under the bottom or lower ovens to pass through and over the ovens in a similar manner, or the heated gases or hot air can be made to pass over the top only of the ovens and thence direct to the chimney, and by these arrangements full opportunity is provided for the internal or external heating of the ovens and a continuous and uniform heat is obtained.

I also employ a V or taper shaped furnace, as shown at P, Fig. 3, which is provided with a flat or arched crown, and with which the flues $f f'$ communicate, the narrowest part being at the bottom, and the form and construction, as shown in the drawings, give better results in the economical consumption of coke or other fuel than is possible with the furnaces at present in use in bakers' ovens. The furnace is constructed of fire-clay lumps or bricks and may be placed at the back or either side of the oven, as may be thought desirable, by altering the position of flues and dampers and without departing from the essential features of the invention, and the furnace is provided with a stoke-hole S H.

The crown of the ovens in Figs. 5, 6, 7, 10, 11, 12, 17, and 18 is constructed of flat or T iron supports, on which rest tiles with grooved or rabbeted joints to prevent the escape of heat or steam from the ovens, or in place of tiles sheet-iron may be used, riveted or bolted to the flat or T iron supports, with a layer of thin bricks, tiles, or fire-clay over the top thereof, and the ovens may be bound together in the usual manner with iron rods, &c., and the materials used in the general construction are the same as those at present employed.

The interior ovens are shown at $O'$ $O^2$ $O^3$ $O^4$, and said ovens are provided with the usual tiled bottoms $b$, and the outlets from the ovens $O'$ and $O^2$ to the flues $f^2$, $f^3$, $f^4$, and $f^5$ are shown at Z. The flues $f$, $f'$, $f^2$ $f^3$, $f^4$, and $f^5$ in the several drawings connect the furnace with the uptakes and ovens, and the flue $f$ also extends direct from the furnace to the chimney.

The dampers $d$ in the several figures of the drawings connect the uptakes X X Y Y with the interior of the ovens and should be made steam-tight, and the other dampers, as shown in the several figures of the drawings, are as follows: The damper $d'$ is in the flue, which extends from the furnace direct to the chimney. The damper $d^2$ controls the communication between the uptakes X X and Y Y with the flues $f^2$ in Figs. 4, 6, and 7 and the flues $f^3$ in Figs. 11 and 12. The damper $d^3$ is steam-tight and controls the communication between the outlet Z and flue $f^2$ in Figs. 4 and 5. The damper $d^4$ is the main damper, which controls the communication of the flues $f^2$ or top flues of the uppermost oven with the chimney, while the damper $d^5$ in Fig. 4 is required when two ovens are built, as in Figs. 11 and 12, with the flues $f^2$ and $f^3$, and the damper $d^6$ is required only when two or more ovens are built and controls the communication of the uptakes X X Y Y with the flues $f^2$ and $f^3$, as shown in Figs. 9, 11, 12, and 16. The dampers $d^7$ are steam-tight dampers, and are shown in Figs. 9, 10, and 17, and control the communication between the outlet Z and the flues $f^3$ and $f^4$. The dampers $d^8$ (shown in Fig. 9) are required when more than two ovens are built and control the flues $f^2$ and $f^3$, as shown in Fig. 17. The dampers $d^9$ (shown in Fig. 15) control the communication between the uptakes X X Y Y with the flues $f^4$. (Shown in Figs. 15 and 17.) The dampers $d^{10}$ in Fig. 15 control the communication from the flues $f^3$ to the flues $f^4$, and the dampers $d^{11}$ are steam-tight dampers, and are shown in Figs. 15, 17, and 18, and control the communication between the ovens $O^3$ and the flue $f^4$. The dampers $d^{12}$ in Figs. 16 and 17 control the communication between the uptakes X X Y Y with the flues $f^5$, while the dampers $d^{13}$ are steam-tight dampers, and are shown in Figs. 16 and 18, and control the communication between the ovens $O^4$ and the flue $f^5$, and the dampers $d^{14}$, Fig. 16, control the communication between the flues $f^4$ and the flues $f^5$.

The damper-handles or the means by which the dampers are operated are designated by the reference-letter H, as shown in the several drawings, and $h$ $h$ in Fig. 18 represent lever-handles for the dampers of the lower ovens, and the outer walls of the ovens are designated by the reference-letter W, and the reference-letter $m$ designates mid-feathers or partitions between the ovens.

The furnace is also provided with an ash-pit A, which is constructed to contain water to facilitate combustion in the furnace and with an air-valve $a^2$ in the door $a^3$ thereof, as shown in Fig. 8, to enable the door to be closed and to regulate the supply of air to the furnace when slow combustion is required. The oven is also provided with a concrete foundation $A'$ and the inlet-openings I, in which steam-tight dampers are fixed, which control the passages to the ovens from the uptakes X X Y Y. The ovens are also provided with a door P and the flues with covers or top plates $t$, composed of tiles or fire-clay, and S represents a covering of sand with a paving of brick thereover.

In working this invention to heat a singly-constructed oven I proceed as follows: All the dampers being closed, I first open the main damper $d^4$, Fig. 4, then the dampers $d$ (connecting uptakes Y Y with interior of oven) and dampers $d^3$ in outlet Z, which allows the heated gases or hot air, as indicated by the arrows, to first pass from the furnace under oven-bottom through outlet Z, through flues $f^2$, and over top of oven to chimney. Second, I open dampers $d^2$ in uptakes X X, which allows the heated gases or hot air to pass from the furnace through flues $f$ and uptakes X X, Fig. 6, to flues $f^2$, over top of oven, and thence to chimney. By the above operations internal and external heating is obtained. Third, to obtain a top external heat, only the dampers $d^2$ in uptakes Y Y being open, I close dampers $d$ in uptakes Y Y and dampers $d^3$ in outlet Z. Fourth, to obtain a direct internal or flood heat I close dampers $d^2$ in uptakes X X Y Y and open dampers $d$ in uptakes X X. Fifth, to obtain a uniform bottom and top external heat I close dampers $d$ in uptakes X X and dampers $d^3$ in outlet Z and open dampers $d^2$ in uptakes X X Y Y, when the heated gases or hot air from the furnace is equally divided and passes through the flues $f$ and $f'$, through uptakes X X Y Y, over the oven, and through flues $f^2$ to chimney, as indicated by the arrows. By opening or closing the dampers on each side of the oven the heated gases or hot air can be made to pass on either side, and consequently gives command over each side of the oven, internally, externally, top, or bottom. In all the above operations the main damper is operated to regulate the draft.

To heat two or more ovens, I proceed in a similar manner as with one oven, with the addition that the heated gases or hot air are made to pass from the furnace or inside of the lower oven into the flues between all the upper ovens, and thence over the top of the uppermost oven to the chimney.

The upper ovens, as well as the lower ovens, can be heated in a manner similar to that described in heating a single oven by regulating the dampers $d^{12}$ in uptakes X X Y Y, both as regards internal, external, top, and bottom heating, as will be understood by reference to the drawings. In working the upper ovens in Figs. 15, 16, and 17 the dampers of uptakes X X Y Y, which are connected to both ends of the ovens, can be worked from the lower level. Should the ovens become overheated, the whole of the heated gases or hot air from the furnace can be made to pass direct to the chimney by the separate flue $f$, and when the ovens are not in operation the main damper $d^4$ can be regulated so as to retain the heat for subsequent baking.

It will be seen from the examples given that the ovens can be heated in a variety of ways and that the upper ovens can be heated without heating the lower ovens and different degrees of heat obtained in the several ovens, as will be indicated by the pyrometers P $r$. It will also be seen that my improved apparatus consists, in fact, of an oven-furnace having a fire-box in the bottom thereof and provided with a plurality of sets of flues arranged horizontally, said sets of flues being always odd in number, and each of said sets consisting of an odd number of separate flues, and an oven arranged horizontally between each of said horizontal sets of flues, together with the uptakes Y Y at the end of the oven-furnace, provided with dampers $d$ and $d^2$, and the outlet Z provided with a damper $d^3$, whereby the products of combustion may be passed through the oven or ovens and beneath and over the same, as shown.

Having fully described my invention, I claim as new and desire to secure by Letters Patent—

1. The herein-described baking apparatus, comprising an oven-furnace, having a fire-box in the bottom thereof, a plurality of sets of horizontal flues arranged within said furnace, the number of said sets of flues being always odd, an oven arranged between each of said horizontal sets of flues, uptakes Y Y provided with dampers $d$ and $d^2$, an outlet Z provided with a damper $d^3$, substantially as and for the purpose described.

2. The herein-described baking apparatus, comprising an oven-furnace, having a fire-box in the bottom thereof, a plurality of sets of horizontal flues arranged within said furnace, the number of said sets of flues being always odd, and the number of flues in each set being also odd, an oven arranged between each of said horizontal sets of flues, and uptakes Y Y, an outlet Z, said uptakes being provided with dampers $d$ and $d^2$, and said outlet with dampers $d^3$, said uptakes being in communication with the fire-box and with said flues and ovens, substantially as shown and described.

3. The herein-described baking apparatus, comprising an oven-furnace, having a fire-box in the bottom thereof, a plurality of sets of horizontal flues arranged within said oven-furnace, said sets being always odd in number, an oven arranged horizontally between each of said sets of flues, uptakes at each end of said furnace-chamber and in communication with said horizontal sets of flues and with said ovens, said uptakes being provided with dampers which control said communications, and an outlet Z provided with a damper $d^3$, whereby the products of combustion may be conducted through, over or beneath said ovens, substantially as shown and described.

4. The herein-described baking apparatus, comprising an oven-furnace having a fire-box in the bottom thereof, said furnace being provided with a plurality of sets of flues arranged horizontally, said sets of flues being always odd in number, an oven arranged horizontally between each of said sets of flues, uptakes at the ends of the furnace forming a communication between the fire-box and said oven and flues, said uptakes being provided with dampers, whereby said communications are controlled, outlets having dampers, whereby the hot gases or products of combustion are made to pass, under, through, between or over each of said ovens, substantially as shown and described.

5. The herein-described baking apparatus, comprising an oven-furnace having a fire-box in the bottom thereof, said furnace being provided with a plurality of sets of flues arranged horizontally, said sets of flues being always odd in number, an oven arranged horizontally between each of said sets of flues, uptakes at the ends of the furnace forming a communication between the fire-box and said oven and flues, said uptakes being provided with dampers, whereby said communications are controlled, outlets having dampers, whereby the hot gases or products of combustion are made to pass, under, through, between or over each of said ovens, the flues in each of said horizontal sets being also odd in number, substantially as shown and described.

6. The herein-described baking apparatus, comprising an oven-furnace having a fire-box in the bottom thereof, said furnace being provided with a plurality of ovens arranged one above another, the upper ovens being provided with a door at one end, and the lower ovens with a door at the opposite end on a different level from that of the doors of the upper ovens, said ovens being also separated by spaces which are odd in number and provided with flues, said flues being also provided with uptakes in communication with the fire-box, and outlets which form a communication between the furnace and the interior and exterior of said ovens, said uptakes and outlets being provided with escape flues or passages, and dampers, whereby the hot gases or products of combustion are passed through, over or beneath said ovens, and to the chimney of the furnace, substantially as shown and described.

THOMAS HITCHEN.

Witnesses:
H. H. DAWSON,
RICHARD LONG.